(12) United States Patent
Janesky

(10) Patent No.: US 6,276,093 B1
(45) Date of Patent: Aug. 21, 2001

(54) AIR-TIGHT SUMP COVER WITH WATER INLET

(76) Inventor: Lawrence M. Janesky, 11 Fawn Meadow La., Huntington, CT (US) 06484

( * ) Notice: Subject to any disclaimer, the term of this patent is extended or adjusted under 35 U.S.C. 154(b) by 0 days.

(21) Appl. No.: 09/440,244

(22) Filed: Nov. 15, 1999

(51) Int. Cl.[7] .................................................. E02D 29/14
(52) U.S. Cl. ............................................................... 52/19
(58) Field of Search ............................. 52/19, 20, 220.1, 52/220.8; 220/212, 826; 210/163

(56) References Cited

U.S. PATENT DOCUMENTS

| | | | |
|---|---|---|---|
| 486,177 | * | 11/1892 | Couzens . |
| 997,928 | * | 7/1911 | McLoughlin . |
| 4,508,469 | * | 4/1985 | Dumortier ................................ 404/25 |
| 5,058,633 | * | 10/1991 | Sharp ........................................ 141/86 |
| 5,832,673 | * | 11/1998 | Cho ............................................. 52/19 |
| 5,925,242 | * | 7/1999 | McGhee ................................. 210/164 |
| 5,945,566 | * | 7/1999 | Gibbs ..................................... 206/361 |
| 6,027,639 | * | 2/2000 | Lenhart, Jr. et al. ................. 210/108 |

* cited by examiner

*Primary Examiner*—Carl D. Friedman
*Assistant Examiner*—Steve Varner
(74) *Attorney, Agent, or Firm*—Perman & Green, LLP

(57) ABSTRACT

Sump container designed to permit gravity flow of flood water from a basement floor through the cover into the sump container and to permit the pumping of water from the container through a discharge conduit passing through an opening in the cover. The cover has a transverse opening to receive a discharge conduit for water pumped from the container to an outside drain, a dividing line through the transverse opening and separating said cover into two removable cover sections, and an air-sealed water inlet through the cover to permit flood water to flow into the container while retarding the escape of odor, radon, moisture and pump noise from the container.

7 Claims, 2 Drawing Sheets

AIR-TIGHT SUMP COVER WITH WATER INLET

BACKGROUND OF THE INVENTION

1. Field of the Invention

The present invention relates to an improved cover for a sump pump container of the type recessed below floor level in the basement of a home or other building. Conventional sump pump containers or reservoirs are plastic pails or barrels which are seated within a sub-floor stone bed or dry well and sump have porous or perforated walls which admit water accumulated beneath the basement floor. The container or reservoir contains a sump pump associated with a discharge conduit which exits through the container cover and through the basement wall. The sump pump has a level-actuation switch and is energized when the water accumulated within the container rises to a predetermined maximum level to actuate the pump and discharge the water through the conduit to an exterior location.

The cover of a conventional sump container is a unitary one-piece cover which is air-tight in order to seal the container against admitting to the basement odors, moisture, insects, radon gas, pump noise, etc. from the container and sump.

A disadvantage of such known sump covers is that they require disassembly of the pump discharge conduit in order to remove the cover to provide access to the interior of the container, such as for servicing of the sump pump, replacement thereof, cleaning of the conduit inlet, or other necessary purposes.

Another disadvantage of such known sump covers is that they are substantially water-tight, as well as air-tight, and therefore they do not permit the free entry of flood water accumulated on the basement floor into the sump container for discharge by the sump pump. Therefore, any flood water accumulated on the basement floor, due to broken water pipes, leaking water heaters, furnaces, washing machines or other appliances, flooded window wells or cracked foundations cannot flow freely into the sump container and must be removed manually or by means of an above-floor pump and discharge conduit. While this can be remedied by making a water-inlet hole in the sump cover to admit flood water, this destroys the air-tight barrier and permits the escape of odors, moisture, insects, radon gas and pump noise from the container into the basement room.

2. State of the Art

Reference is made to applicant's U.S. Pat. Nos. 5,314,313 and 5,927,955 and for their disclosure of prior known systems and devices which incorporate sump pump containers for the accumulation and discharge of water from beneath a basement floor in order to maintain the basement dry.

SUMMARY OF THE INVENTION

The present invention relates to a two-piece cover for a sump container, which permits the free flow of any flood water into the container from a basement floor while providing a seal against the escape of air, radon, odors, noise, insects, etc, from the container.

The invention includes a non-clogging air-seal inlet valve which is activated to open position by the flow of inlet water and which automatically returns to closed, air-tight position in the absence of a flow of inlet water, to prevent or retard the escape of air, radon, odors and pump noises.

THE DRAWINGS

DETAILED DESCRIPTION

Figure 1:
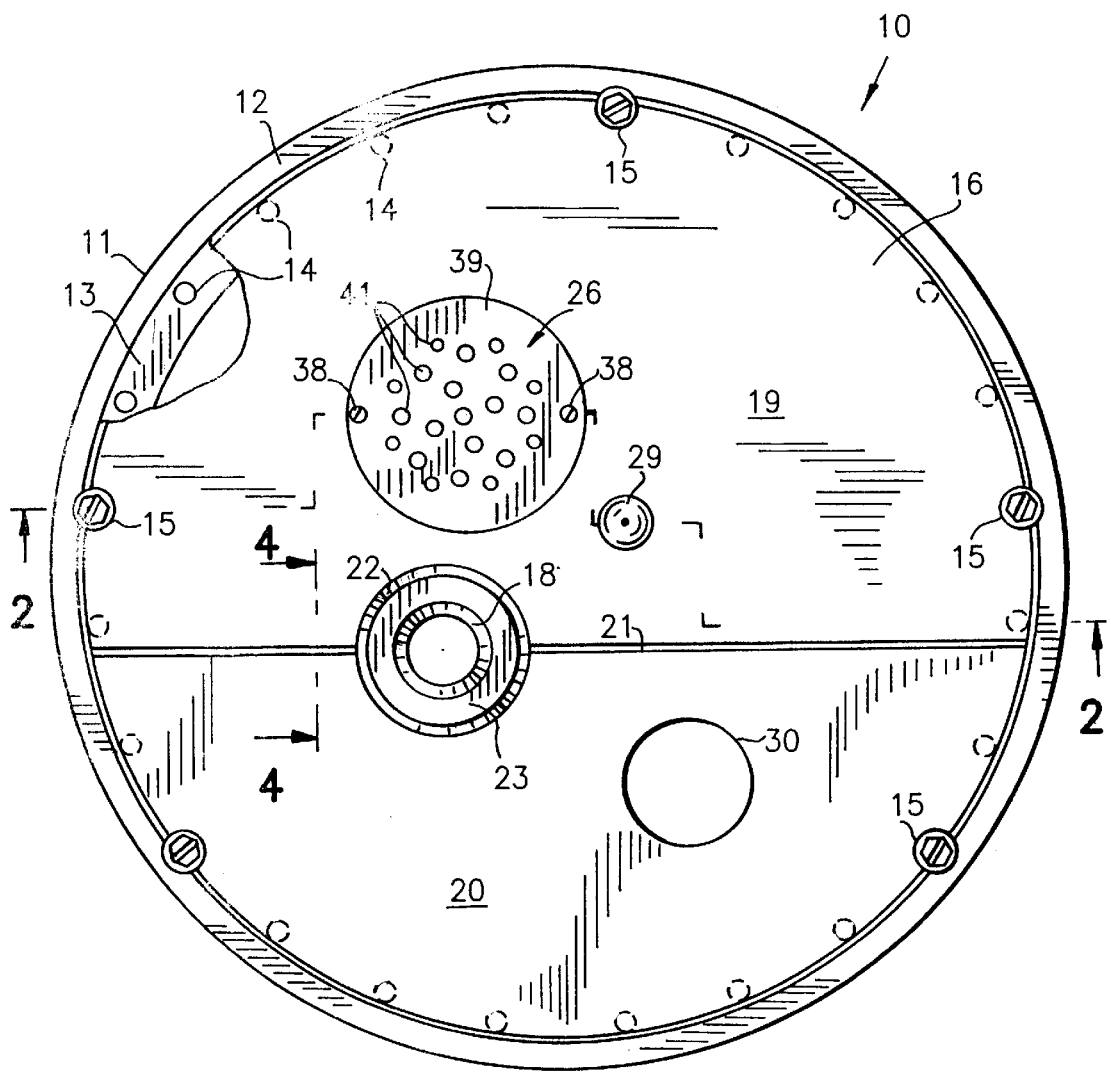
FIG. 1 is a top view of a sump cover fastened to a sump container, according to the present invention.
Figure 4:
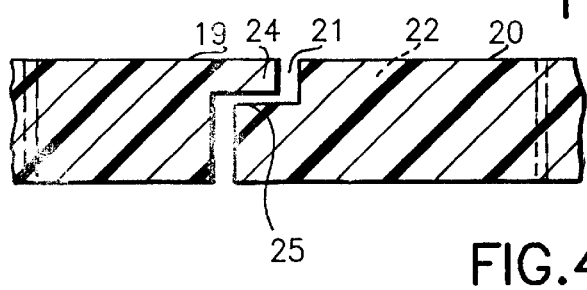
FIG. 4 is a vertical cross-sectional view taken along the line 4—4 of FIG. 1.

Referring to FIG. 1 of the drawings, the present sump container cover assembly 10 comprises a lower reservoir or container 11 having an upper annular rim 12 with an annular cover-receiving recessed ledge 13 containing a plurality of spaced bolt-engaging holes 14 which provide alternative attachment sites for five lag bolts 15 used to fasten the cover 16 in a desired oriented position.

The cover 16, in the illustrated embodiment, is provided with five strategically located openings 17 or open slots, one each to provide access for the five lag bolts 15 to the holes 14 into which they are to be engaged to fasten the cover 16 to the container ledge 13. The spacing of the cover openings 17 enables the cover to be rotated an inch or two to accommodate the offset location of the transverse, water-discharge conduit 18, in which position the cover openings 17 will be aligned with five of the container holes 14 for attachment of the five lag bolts 15.

The present container cover 16 comprises two sections, 19 and 20, divided along a line 21 which intersects a transverse opening neck 22 which accommodates the conventional water-discharge conduit 18 and a surrounding sealing bushing 23. One cover section contains an upper overlapping flange or lip extension 24 while the other cover section contains a recessed underlying shelf extension 25 which engages the lip extension 24 along line 21, except in the area of cover neck 22 surrounding the conduit 18, to provide air-sealing engagement between the edges of the cover sections 19 and 20.

As is clear from FIG. 1, either cover section 19 and/or 20 can be removed from the container 11, without disturbing the water discharge conduit 18, to provide access to the interior of the container, such as for servicing of the sump pump. This avoids the need to cut the conduit 18, above the cover, for removal thereof, which necessitates replacement or repair thereof.

The cover 16 of the drawings also contains a novel flood water inlet drain 26, an optional transverse opening 27 surrounded by an elevated collar 28 for supporting an alarm water-level sensor 29, another transverse opening 45 for a wire harness (not shown) for powering the sump pump and a sealing bushing. The sensor 29 is connected to an audible warning means or alarm which it activates when the water level rises thereto, to signal that the sump pump is not operating, as disclosed in my U.S. Pat. No. 5,314,313. The collar or lip 28 raises the sensor 29 above the plane of the cover 16 to prevent false activation of the sensor by flood water leaking down over the sensor from above the cover.

The present water inlet or drain 26 comprises a novel clog-resistant design which permits the free flow of water from above, such as flood water accumulated on the basement floor, while providing an air seal against the escape of odors, radon, insects, moisture, noise, etc. from within the sump container.

Referring to the drawings, the present drain 26 comprises a cup or housing 30 having a side wall 31 tapered down from an upper flange 30a to a floor wall 32 having a central axial drain passage 33 surrounded by a raised drain tube or collar 34 which extends, from the floor wall 32 up into the interior of the housing 30, a small distance above the floor wall 32. The upper circular inlet face of the drain collar 34 is uniform and smooth to provide a circular air seal seat 35 for a buoyant, lightweight, round closure ball 36 having a uniform smooth surface which seals against the seat 35 of the drain collar 34 in the absence of inlet water within the drain housing 30, as illustrated by FIG. 2.

Figure 2:
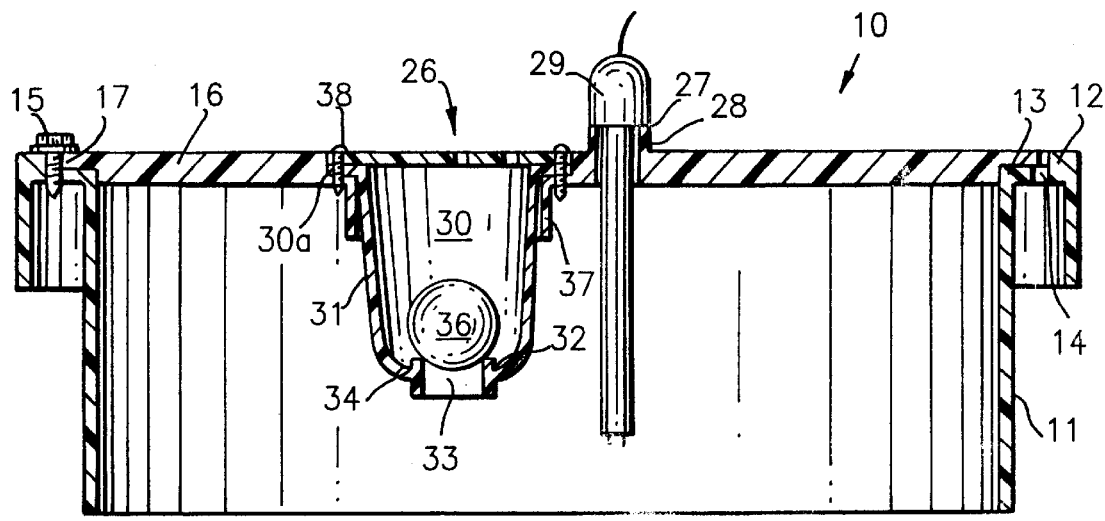
FIG. 2 is a cross-sectional view taken along line 2—2 of FIG. 1.

The drain housing 30 is fastened to the sump container cover 16 by insertion thereof down into a tubular walled opening 37 in the cover and securement to a surrounding flange 30a by means of bolts 38 passing through a drain cover 39 and through openings 40 in the drain housing flange 30a, as shown in FIG. 2. The drain cover 39 is recessed flush with the surface of the sump container cover 16 and is provided with a plurality of water inlet holes 41 which permit the free entry of any water present on the basement floor down into the drain 26.

Figure 3:
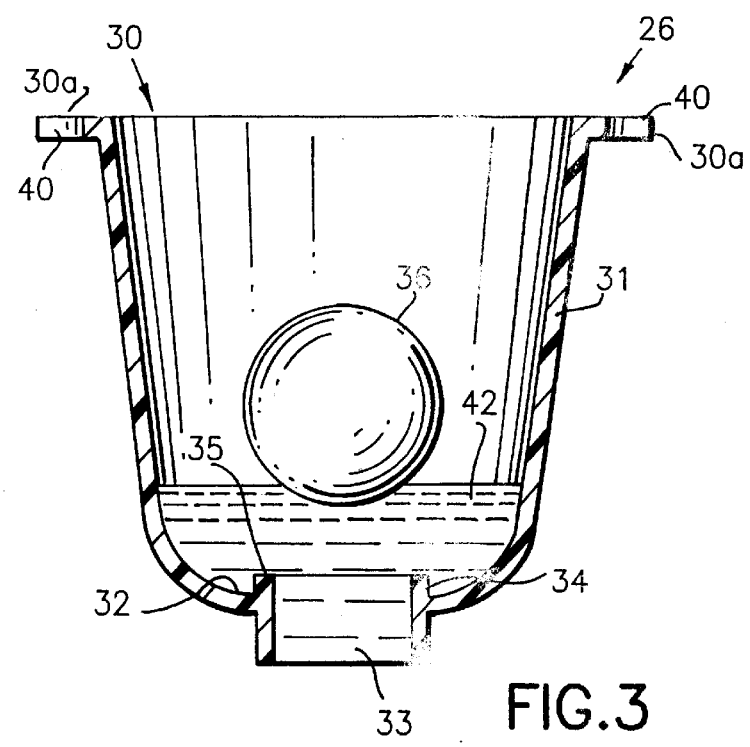
FIG. 3 is a cross-sectional view of a water-inlet valve assembly according to the present invention, illustrated in open position.

As illustrated by FIG. 3, the diameter of the sealing ball 36 is greater than that of the collar 34 but less than the inner diameter of the wall 31 of the cup housing 30 at the height above the collar seat 35 corresponding to the radius of the ball 36. This enables incoming water 42 to flow between the ball 36 and the cup wall 31 down to the floor 32 of the cup, beneath the ball 36 elevated on the drain collar 34, to float the ball 36 and open the drain passage 33 to the gravity discharge of water, as shown by FIG. 3, down into the sump container 11.

The novel design of the present drain 26 permits the free drainage of flood water containing dirt and sand without the problem of clogging and stoppage encountered with conventional pipe elbows normally used to provide air seals in sink drains. Moreover, it prevents the weight of incoming water from holding the ball 36 down against the seat 35 by enabling the water to flow down between the ball 36 and the peripheral wall 31 and under the buoyant ball 36 to float it off of the drain seat 35 to permit free discharge of the water through the drain passage and to flush with it any dirt or sand so that the ball can re-seal on the seat 35 when water ceases entering the drain 26. This re-seals the sump cover 16 against the escape of odors, radon gas, moisture, etc. from within the sump container.

While the invention has been described in detail with reference to specific preferred embodiments, it will be appreciated that various modifications may be made from the specific details without departing from the spirit and scope of the invention.

What is claimed is:

1. Sump container cover adapted to be fastened to and to seal a sump pump container recessed below the surface of a floor and designed to permit gravity flow of flood water from the floor through said cover into said container and to permit the pumping of water from said container through a discharge conduit which passes through an opening in said cover, said cover comprising an outer periphery having a plurality of bolt openings for fastening the cover to a sump pump container, a transverse opening through the cover surrounded by a sealing bushing, to receive and sealingly engage a discharge conduit for water pumped from the container to an outside drain, a dividing line intersecting said transverse opening and separating said cover into cover sections which are independently removable from said sump pump container to provide access to the interior thereof without disturbing a discharge conduit passing through said transverse opening, and an air-sealed water inlet through said cover to permit flood water to flow into the container while retarding the escape of odor, radon, moisture and pump noise from the container.

2. A sump container cover according to claim 1 comprising a plurality of lag bolts, one for each of the bolt openings, for fastening the cover sections to the sump pump container.

3. A sump container cover according to claim 1 in which said dividing line is between an overlapping surface flange on one of the cover sections and an underlying flange on the other cover section, forming an air seal partition between the two cover sections.

4. A sump container cover according to claim 1 in which said air-sealed water inlet is a clog-resistant passage comprising a cup member recessed below the surface of the cover, at least one opening through the cover to admit flood water into said cup; said cup having a floor having an outlet drain into the sump pump container, said drain comprising a collar portion elevated above the floor of the cup, and a buoyant member seated on said lip and providing an air-seal between the cup and the sump pump container, the flow of flood water through the opening in the sump container cover into said cup causing said buoyant member to unseat from said drain collar to permit the flood water to flow through said drain into an underlying sump pump container, and the cessation of flow of flood water causing the buoyant member to re-seat on said drain collar.

5. A sump container cover according to claim 4 in which said drain collar is circular and said buoyant member comprises a hollow plastic ball.

6. A sump container cover according to claim 4 in which said cup member comprises an upper flange which attaches the cup member to the undersurface of the container cover.

7. A sump container cover according to claim 4 in which said at least one opening through said container cover comprises a plurality of openings through a lid fastened to the sump container cover overlying said cup member.

* * * * *